United States Patent
Irizarry, Jr.

(10) Patent No.: US 9,311,324 B2
(45) Date of Patent: Apr. 12, 2016

(54) SYNCHRONIZING DATA AMONG A FEDERATION OF SERVERS WITH INTERMITTENT OR LOW SIGNAL BANDWIDTH

(75) Inventor: Nazario Irizarry, Jr., Merrimack, NH (US)

(73) Assignee: MITRE Corporation, McLean, VA (US)

(*) Notice: Subject to any disclaimer, the term of this patent is extended or adjusted under 35 U.S.C. 154(b) by 1287 days.

(21) Appl. No.: 13/014,387

(22) Filed: Jan. 26, 2011

(65) Prior Publication Data

US 2012/0191651 A1 Jul. 26, 2012

(51) Int. Cl.
G06F 7/00 (2006.01)
G06F 17/30 (2006.01)
H04L 29/08 (2006.01)

(52) U.S. Cl.
CPC ...... *G06F 17/30174* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 7,526,533 B1* | 4/2009 | Bue et al. | 709/220 |
| 8,204,996 B2* | 6/2012 | Kim et al. | 709/227 |
| 2002/0059425 A1* | 5/2002 | Belfiore et al. | 709/226 |
| 2006/0206768 A1* | 9/2006 | Varghese | 714/48 |
| 2006/0265385 A1* | 11/2006 | Agrawal et al. | 707/10 |
| 2008/0209007 A1* | 8/2008 | Gurecki et al. | 709/218 |
| 2009/0106455 A1* | 4/2009 | Xu et al. | 709/248 |
| 2009/0222496 A1* | 9/2009 | Liu et al. | 707/204 |
| 2009/0307281 A1* | 12/2009 | McCarthy et al. | 707/203 |
| 2009/0319535 A1* | 12/2009 | Webber et al. | 707/10 |
| 2010/0138444 A1* | 6/2010 | Logue et al. | 707/769 |
| 2011/0113015 A1* | 5/2011 | Cannon et al. | 707/650 |
| 2012/0036566 A1* | 2/2012 | Nicholson et al. | 726/7 |

* cited by examiner

*Primary Examiner* — Hosain Alam
*Assistant Examiner* — Thu Nga Nguyen
(74) *Attorney, Agent, or Firm* — Proskauer Rose LLP

(57) ABSTRACT

A computerized-method of synchronizing data among a federation of servers interconnected over a network that has intermittent or low signal transmission bandwidth is provided. Each server in the federation of servers can receive update messages, determines connection status, maintain data catalogs and transmits updates such that nodes in the federation of servers are synchronized.

16 Claims, 8 Drawing Sheets

SYNCHRONIZING DATA AMONG A FEDERATION OF SERVERS WITH INTERMITTENT OR LOW SIGNAL BANDWIDTH

FIELD OF THE INVENTION

The present invention relates to synchronizing data among a federation of servers with intermittent or low signal bandwidth.

BACKGROUND OF THE INVENTION

Data synchronization is a requirement of many types of communication systems. For example, commanders of military systems need to rapidly and effectively synchronize data to respond to time-constrained operations. In many instances, systems are geographically dispersed and are connected over unreliable logical and physical connections. For example, communication systems that incorporate ships or airplanes may not have constant connectivity with command centers because of the physical and electrical limitations of antennas and the changing physical orientation of the platforms.

Communication between system elements (e.g., nodes) can be reduced or interrupted at any time for a variety of reasons. For example, system elements can be destroyed and/or elements can be required to power down at various times. In some instances, communication between nodes can be interrupted or stopped several times per hour or for days at a time. Node recovery and data synchronization over disconnected, intermittent, or limited bandwidth (DIL) channels can be difficult to achieve with current systems that assume high availability, high throughput and low latency node-to-node links.

Therefore, it is desirable for systems that assume communications will fail and be restored. It is also desirable for systems that seamlessly synchronize when communications are restored.

SUMMARY OF THE INVENTION

Advantages of the invention include reliable data synchronization over intermittent and low bandwidth communication channels, non-centralized data and control, nodes that can be organized in ad-hoc topologies, continuous and automatic failover and optimization for quick recovery after disconnect.

In one aspect, the invention features a computerized-method of synchronizing data among a federation of servers interconnected over a network having at least one of intermittent or low signal transmission bandwidth. The method involves receiving, by a first server that is part of the federation of servers, an update message from one or more servers that is part of the federation of servers. The method also involves determining, by the first server, a connection status for one or more servers in the federation of servers and maintaining, by the first server, a catalog of data sets that reside on the first server based on the status and the update message received from one or more of the servers in the federations of servers. The method also involves determining, by the first server, if each data set that resides on the first server is erroneous based on the connection status and the catalog. The method also involves transmitting, by the first server, one or more update requests to each server of the federation of servers that is an authoritative server of one or more of the erroneous data sets and synchronizing, by the first server, the erroneous data sets that reside on the first server by receiving one or more responses to the one or more update requests.

In some embodiments, determining a connection status for each server in the federation of servers involves determining if the first server is fully connected, partially connected, or disconnected to each server that is part of the federation of servers based on a number of messages received by the first server from each of the servers within a time duration; and determining if a value of a local clock of the first server is substantially similar to a value of a clock of one or more servers that is part of the federation of servers based on whether the first server is fully connected, partially connected or disconnected.

In some embodiments, maintaining a catalog for each data set that resides on the first server involves determining an identity of an authoritative server for the data set in each of the one or more received update messages and the one or more received responses, determining an identify of a backup server for the data set in each of the one or more received update messages and the one or more received responses, determining a size and type for the data set in each of the one or more received update messages and the one or more received responses, and storing, for each data set of the one or more received update messages and the one or more received responses, the authoritative server, the backup server, the size of the data and the type of the data.

In some embodiments, the method involves comparing, by the first server, each data set received by the first server with a corresponding data set that is stored on the first server and overwriting, by the first server, the corresponding data set that is stored on the first server with received data if the received data was transmitted by a server that owns the data set or if time stamps of the received data are later in time than time stamps of the corresponding data set.

In some embodiments, the method involves determining, by the first server, a checksum tree for each data set stored on the first server and comparing, by the first server, for each data set stored on the first server, the determined checksum tree with a reference checksum tree received from the authoritative server for each data set stored on the first server.

In some embodiments, the method involves determining, by the first server, a checksum tree value for each data set the first server transmits based on the checksum tree of each data set and determining, by the first server, a portion of the checksum tree to transmit based on the checksum tree value.

In some embodiments, the method involves determining, by the first server, a maximum rate at which messages can be transmitted to each of the servers in the federation servers and limiting, by the first server, a rate at which messages are transmitted to each server of the federation of servers that is connected within the time duration.

In some embodiments, the method involves determining, by the first server, a number of incomplete client requests stored on the first server and delaying, by the first server, subsequent received client requests for a time duration if the number of incomplete client requests exceeds a maximum number of incomplete client requests, wherein the time duration is based on the number of incomplete client requests stored on the first server.

In some embodiments, the method involves designating, by the first server, one server of the federation of servers as a backup server for each data set stored on the first server, wherein the backup server receives the data sets that reside on the first server, and is prepared to act as a backup if the first server becomes disconnected.

In some embodiments, the method involves receiving, by the backup server, the update message from one or more servers that is part of the federation of servers, determining, by the backup server, a connection status for one or more servers in the federation of servers, maintaining, by the backup server, a catalog for each data set that resides on the backup server based on the status and the update message received from one or more of the servers in the federations of servers, determining, by the backup server, if each data set that resides on the backup server is erroneous based on the connection status and the catalog, transmitting, by the backup server, one or more update requests to each server of the federation of servers that is an authoritative server of one or more of the erroneous data sets, and synchronizing, by the backup server, the erroneous data sets that reside on the first server by receiving one or more responses to the one or more update requests.

In some embodiments, the method involves determining, by the backup server, if the first server is disconnected and synchronizing, by the backup server, the first server with the backup server when the first server reconnects by transmitting at least a portion of one of the data sets and the catalogs to the first server.

In some embodiments, the method involves determining, by the first server, a checksum value based on a checksum tree for each data set that the first server is an authority and transmitting, by the first server, the checksum value and the maximum rate at which the first server can receive messages to each server in the federation of servers.

In some embodiments, the method involves determining, by the first server, if a received request is redundant by comparing the received request to any request received a time duration prior to the time at which the received request was received.

In some embodiments, the method involves determining, by the first server, each server in the federation of servers that is subscribed to the first server, wherein each server is directly connected to the first server or connected to a server in the federation of servers that is directly connected to the first server and transmitting, by the first server, data to each server in the federation of servers that is subscribed to the first server.

In another aspect, the invention features a computer program product tangibly embodies in a non-transitory machine-readable storage device for synchronizing data among a federation of servers interconnected with intermittent and low bandwidth. The computer program product being operable to cause a first server that is part of a federation of servers to receive an update message from one or more servers that is part of the federation of servers, determine a connection status for one or more servers in the federation of servers and maintain a catalog for each data set that resides on the first server based on the status and the update message received from one or more of the servers in the federations of servers. The computer program product is also operable to cause the first server to determine if each data set that resides on the first server is erroneous based on the connection status and the catalog, transmit one or more update requests to each server of the federation of servers that is an authoritative server of one or more of the erroneous data sets, and synchronize the erroneous data sets that reside on the first server by receiving one or more responses to the one or more update requests.

In some embodiments, determining a connection status for each server in the federation of servers involves determining if the first server is fully connected, partially connected, or disconnected to each server that is part of the federation of servers based on a number of messages received by the first server from each of the servers within a time duration and determining if a value of a local clock of the first server is substantially similar to a value of a clock of one or more servers that is part of the federation of servers based on whether the first server is fully connected, partially connected or disconnected.

In some embodiments, maintaining a catalog for each data set that resides on the first server involves determining an identity of an authoritative server for the data set in each of the one or more received update messages and the one or more received responses, determining an identify of a backup server for the data set in each of the one or more received update messages and the one or more received responses, determining a size and type for the data set in each of the one or more received update messages and the one or more received responses, and storing, for each data set of the one or more received update messages and the one or more received responses, the authoritative server, the backup server, the size of the data and the type of the data.

BRIEF DESCRIPTION OF THE DRAWINGS

The foregoing features of the invention will be more readily understood by reference to the following detailed description, taken with reference to the accompanying drawings, in which.

DETAILED DESCRIPTION OF ILLUSTRATIVE EMBODIMENTS

Figure 1:
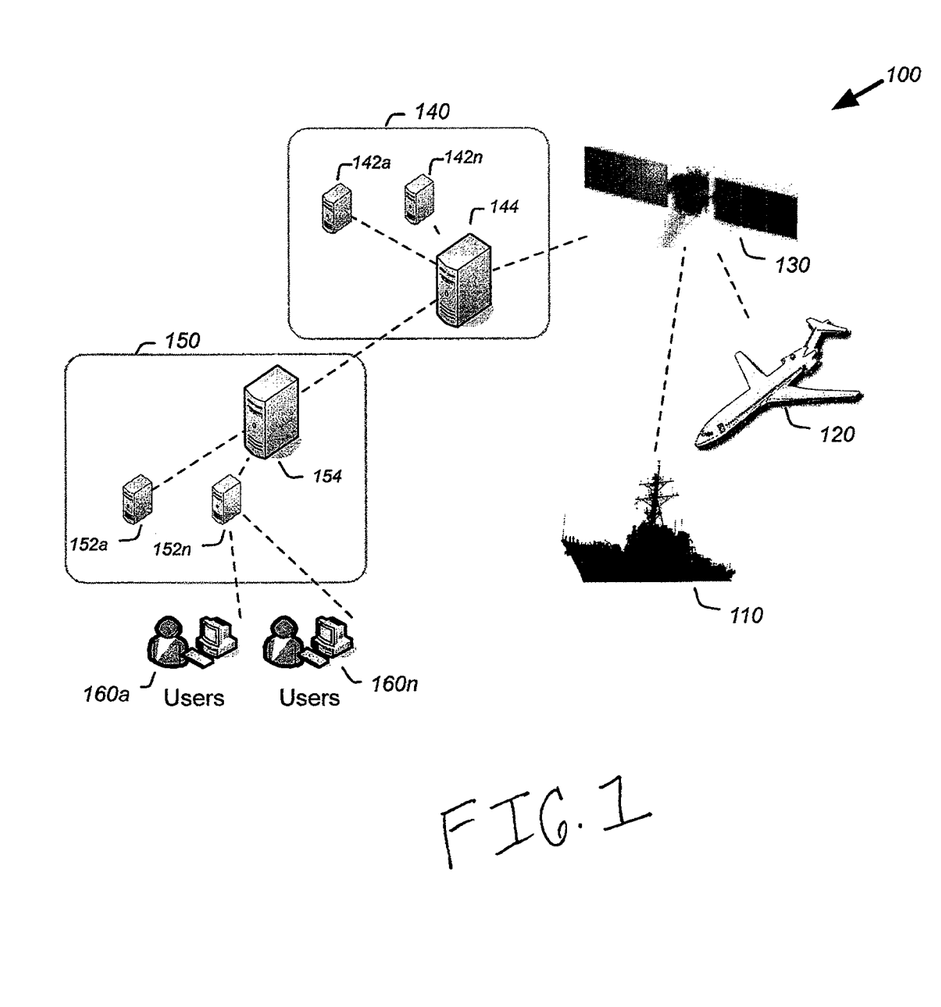
FIG. 1 is a diagram showing an exemplary federation, according to an illustrative embodiment of the invention.

FIG. 1 is a diagram showing an exemplary communications system, referred to throughout the specification as federation 100. Federation 100 includes federation node 110 (a ship), federation node 120 (an airplane), satellite 130, federation node 140, and federation node 150. Federation node 140 includes application client 142a, . . . application client 142n, generally application clients 142, and synchronization server 144. Federation node 150 includes application client 152a, . . . client 152n, generally application clients 152 and synchronization server 154. Airplane 120 and ship 110 also include federation servers but they are not shown. User 160a, . . . , user 160n, generally users 160 are connected to application client 152.

Communication in federation 100 can occur between ship 110 and satellite 130, airplane 120 and satellite 130, satellite 130 and servers 144, servers 144 and servers 154, or any combination thereof. The federation 100 can communicate one or more types of messages between the nodes (e.g., location information from ship 110 to satellite 130 or a command heading from users 160 to airplane 120).

Each node in the federation 100 can include synchronization processes that ensure each node within the federation 100 is synchronized with the other nodes. Federation 100 is shown for exemplary purposes only. One of ordinary skill in the art can appreciate that a federation can be any system that has multiple nodes with federation servers communicating. One of ordinary skill in the art can also appreciate that a federation can include any number of servers and that one or more servers can make up a node. In some embodiments, the number of nodes within a federation of servers is less than 10. In some embodiments the number of data sets between all of the nodes in the federation is less than 1000.

Figure 2:
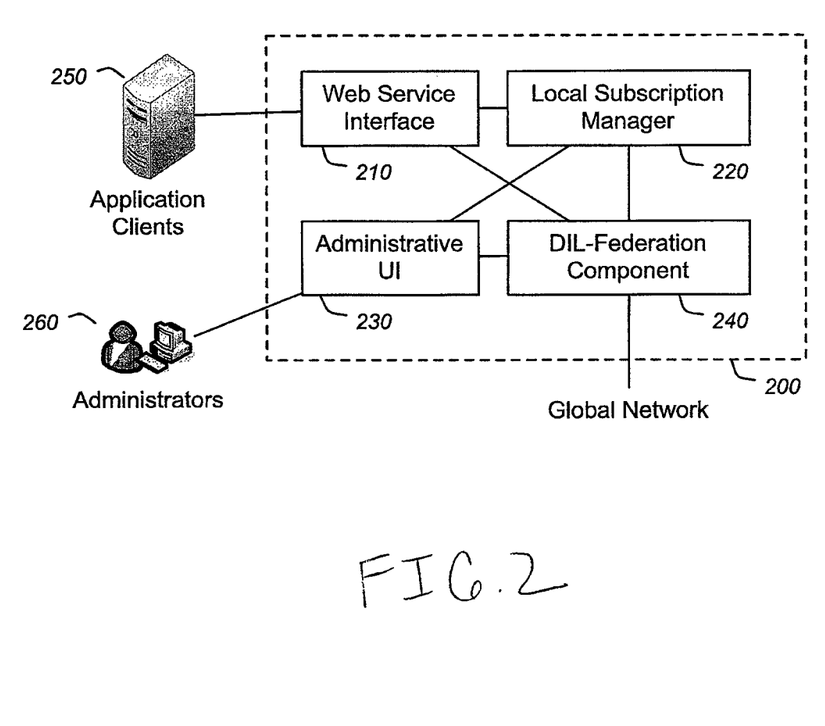
FIG. 2 is a diagram of an exemplary node for synchronizing data among a federation of servers, according to an illustrative embodiment of the invention.

FIG. 2 is a diagram of an exemplary node 200 for synchronizing data among a federation of servers, according to an illustrative embodiment of the invention. The node 200 includes a web service interface 210, a local subscription manager 220, an administrative user interface 230 and a DIL federation component 240 (e.g., synchronization processes). The administrative interface 230 allows one or more administrators 260 to interface with node 200. The administrators can monitor and control the node 200. The web service interface 210 allows node 200 to interface with application clients 250. Local subscription manager 220 allows node 200 to control data and metadata of the node 200. The DIL federation component 240 synchronizes node 200 with other nodes (e.g., global network elements) that are within the node's 200 federation. In some embodiments, the DIL federation component 240 synchronizes a data cache of the node 200 with other nodes.

Figure 3:
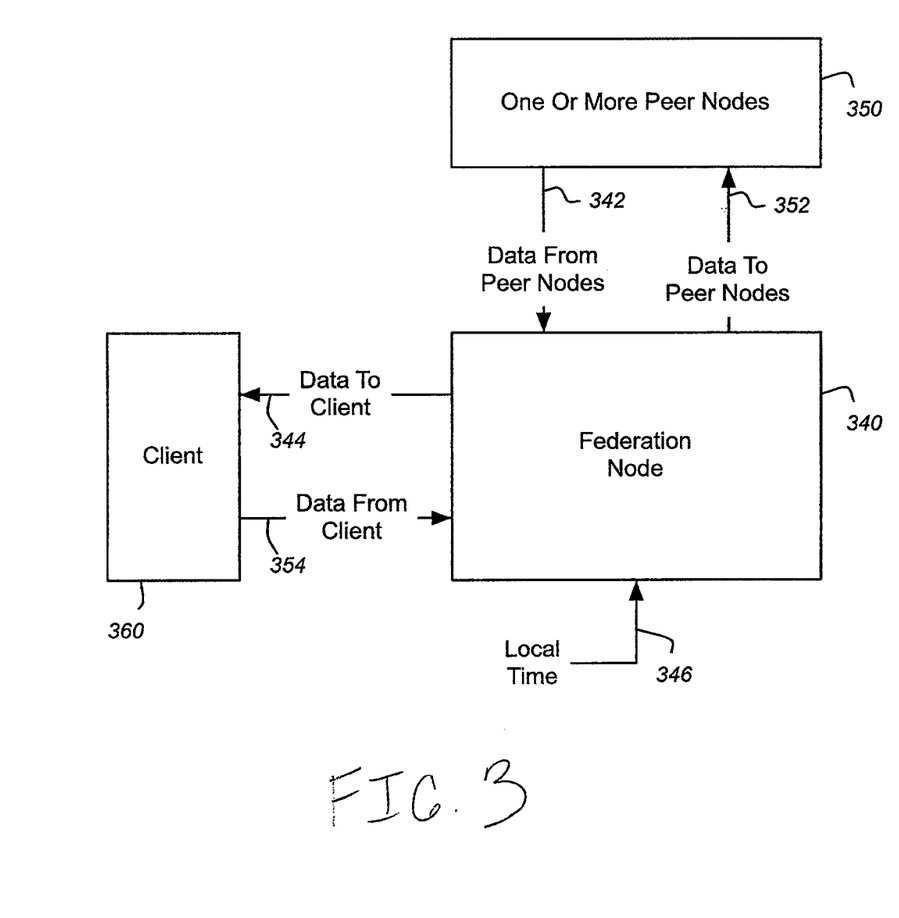
FIG. 3 is a system module diagram of a system for synchronizing data among a federation of servers interconnected over a network having at least one of intermittent or low signal transmission bandwidth, according to an illustrative embodiment of the invention.

FIG. 3 is a system module diagram 300 of a system for synchronizing data among a federation of servers interconnected over a network having at least one of intermittent or low signal transmission bandwidth, according to an illustrative embodiment of the invention. A federation node 340 (e.g., node 200 as described above in FIG. 2) can include input 342 to receive data from one or more peer nodes 350, input 344 to receive data from a client 360, and input 346 to receive a local time of the federation node 340. The federation node 340 can include output 352 that outputs data to peer nodes 350 and output 354 that outputs data to the client 360. In some embodiments, the peer nodes 350 have intermittent connectivity with federation node 340. In some embodiments, the peer nodes 350 have bandwidth limited connectivity with federation node 340. In some embodiments, the federation node 340 and the client 360 are implemented on one server. In some embodiments, the federation node 340 and the client 360 are implemented on separate servers.

Each node in the federation of servers can include a core data model. The core data model can include one or more objects (e.g., sites, catalogs, data sets). Table 3 illustrates exemplary core data model items.

TABLE 3

| Item | Description | Key Fields |
|---|---|---|
| Site | Represents each federation node and its up/down status | Name<br>Up/Down status<br>Summary checksum (both locally derived and as remotely stated)<br>Time last in sync for all data sets<br>Estimated clock difference between this node and the transmit node |
| Catalog | List of data sets | List of data sets |
| Data Set | A collection of content items | Name<br>Id |

TABLE 3-continued

| Item | Description | Key Fields |
|---|---|---|
| | | Type<br>Home node<br>Backup node<br>Home or Backup active flag<br>Exposure flag<br>64-bit checksum<br>Latest content change time<br>Number of opaque elements<br>Time last determined to be fully in sync<br>Checksum tree (both locally derived and as remotely stated)<br>List of opaque elements |
| Opaque Element | A content item | Unique id (unique within the data set)<br>Type<br>MD5 content hash<br>Time of last modification<br>Size<br>Opaque content string |
| Checksum Tree | A structure used to determine missing or out of sync data | Checksums of aggregated data content<br>Checksums of individual data elements |

Each node in the federation of servers can maintain a catalog (e.g., up to date list) of data sets and meta-data of the data sets offered by peer nodes. When it is determined that a catalog of a peer node is not synchronized with the local node's version of that catalog, the local node can request a transmission of the full catalog from the peer node. The request for transmission of the catalog can be regulated to prevent congestion of the nodes. In some embodiments, requests for transmission of the full catalog are limited to one every three minutes. Peer nodes can see the request for transmission of the catalog from the local node and delay sending their own request for transmission of a catalog to prevent the network from becoming over congested. For example, if Node A requests a catalog from Node B, then Node C can see the request and suppress its own request to Node B.

Each node in the federation of servers can transmit one or more heartbeat messages to its peer nodes with a frequency. The one or more heartbeat messages can include checksum data. In some embodiments, the checksum data is 64-bit. In some embodiments, each node in the federation of servers transmits a short heartbeat message every seven seconds. In some embodiments, each node in the federation of servers transmits a long heartbeat message every five minutes. The long heartbeat message can include the transmitting node's disk space, number of data sets being tracked, number of content items being tracked, and the ability to see messages from other nodes. In some embodiments, the heartbeat messages are viewable by an administrator. In some embodiments, the heartbeat messages are used to compute clock differences between the receiving node's clock and the transmitting node's clock.

Table 4 illustrates exemplary status and catalog messages received by all nodes of the federation.

TABLE 4

| Message | Description |
| --- | --- |
| Node-is-Alive | Can be emitted approximately every seven seconds from each node. Can contain a summary checksum rolled up from the data sets and content homed at the node.<br>Heartbeats can be suppressed at times to save bandwidth if there is a catalog advertisement or a data set metadata advertisement. Such messages clearly indicate that the sending node is "alive and connected."<br>Every few minutes this message can also contain additional node information, such as how much memory is being used and how much disk-space is in use. This can allow site administrators to watch each other's federation nodes, monitoring basic runtime information. Heartbeats can also contain a local time-stamp in milliseconds that is used by receiving nodes to estimate a clock correction term. The message can have a time-to-live of 2 minutes.<br>The message can also occasionally contain a time-stamp for when the node believed it was last fully in sync on all of its subscribed data sets. |
| State-Catalog | Lists the data sets that a node owns (and its summary metadata). This message can be sent as a response to an explicit request or as a result of creating or deleting a new locally homed data set. This message can have a time-to-live of 5 minutes. |
| Request-Catalog | Sent by a node that has just come online and needs to acquire another node's catalog.<br>This message can also be sent if the remote node's summary checksum does not agree with the locally computed summary checksum. This message can have a time-to-live of 2 minutes. |
| Request-to-Create-Data-Set, Request-to-Delete-Data-Set | A node can request another node to create or delete a data set. Neither action is assumed to take effect until the remote node "acknowledges" the change by sending a new State-Catalog message. If the remote node is disconnected the data set can be deleted locally anyway. This message can have a time-to-live of 5 minutes |

Each node in the federation can synchronize its contents with peer nodes. A node may or may not be subscribed for a peer node's data sets. A node can designate one or more peer nodes as a backup node for one or more data sets. For example, Node A that includes data set 1 and data set 2 can designate Node B to backup data set 1 and Node C to backup data set 2. In another example, Node A designates Node B to backup data set 1 and data set 2. In some embodiments, each node can change its backup node dynamically. In some embodiments, each backup node claims authority over data of the primary node in the event the primary node becomes disconnected. In some embodiments, when a node that has a designated backup node goes down (e.g., is unreachable or disconnected), the backup node can assume responsibilities of the node. The backup node can transmit acknowledgment and list the data set in catalog messages on behalf of the down node.

Data can be shared between two nodes based on whether one node is subscribed to the other node and/or whether one node is a backup to another node. For example, if Node A is subscribed to Node B but Node A is not a backup for Node B, then Node A can maintain a list of available content items (e.g., data) of Node B, receive content changes of Node B from any node in the federation, delete content based on incoming changes to the content of Node B, and obtain missing content by requesting it from Node B or Node B's backup node. In this example, if Node A receives a content change of Node B's contents from peer Node C, then Node A does not have to acknowledge the content changes.

In another example, if Node A is a backup node for Node B, and if Node B is currently disconnected, then if Node A receives a content change of Node B's contents, then Node A must acknowledge the content change. In some embodiments, the acknowledgment contains an updated checksum tree. In various embodiments, each node can be a home node (e.g. authoritative node or authoritative server), a backup node and/or a cache node for any data set in the federation of servers. In various embodiments, each node identifies a data set it owns (e.g., authoritative node) by setting a field in meta data of the data set that is distributed as part of the node's catalog and transmitting revised meta-data to the federation. In some embodiments, each node determines whether to subscribe to each peer node based on the data needs of one or more its client applications. Table 5 illustrates exemplary content messages received if a node is subscribed to a peer node.

TABLE 5

| Message | Description |
| --- | --- |
| State-Changed-Contents | This message can be sent from any node that makes a change to content whether it is locally or remotely homed.<br>This message can identify the data set's id, the content's id, a local time-stamp, and the new, modified, or deleted content. A single message can batch multiple content changes for the same data set. The content can be compressed using GZIP compression.<br>When the content's home receives this message it can send an updated checksum for the data set as part of the State-Data-Set-Metadata message. |

TABLE 5-continued

| Message | Description |
|---|---|
| | Multiple change messages to the same home for the same data set can be "acknowledged" with a single summary checksum update for bandwidth efficiency.<br>This message can have a time-to-live of 15 minutes. |
| State-Data-Set-Metadata | This message can provide the id, time of last modification, number-of-elements, the name of a data set, and either a partial or full checksum tree.<br>Metadata can be updated and sent by a home node within about half of a second of receiving changed content for a data set. This can also be sent as a direct response to the Request-Checksum-Tree message.<br>This message can have a time-to-live of 15 minutes. |
| Request-Checksum-Tree | A State-Data-Set-Metadata message typically only contains an abbreviated checksum tree to preserve bandwidth. However, if a remote node determines that its locally computed data set checksum tree (updated with the abbreviated checksum tree) lacks integrity it can request a resend of the full tree.<br>This message can have a time-to-live of 1 minute. |
| Request-Contents | When a node determines that it has missing or inconsistent data, the node can identify which data elements are inconsistent with this message as accurately as possible. The home node can then send the correct elements using a State-Changed-Contents message. This message can have a time-to-live of 2 minutes.<br>This message can request all content or partial content. When requesting partial content this message can contain a list of content bins that are being requested. This message can also contain a conditional checksum. The checksum can be the sender's current checksum for the data set. If, by the time the home receives this message, its data set checksum matches the conditional checksum, then no content is sent under the assumption that the original discrepancy was due to content received by the sender that had not been received by the home. |

Table 6 illustrates exemplary messages received if a node is subscribed and recovers from being down.

TABLE 6

| Message | Description |
|---|---|
| Request-Data-Set-Pause | When a node rejoins the federation, each node that is already up can decide whether it has any data set with changes to send to the new node to bring it up to date. If it determines that there are changes to be sent, it sends this message to alert all nodes that it is going to do so. The home can refrain from sending out updated metadata to avoid confusion until the updates are received.<br>This message can trigger a short (e.g., 15 second) pause. The pause can help ensure that data synchronization does not get locked out if communications go bad and the updates never arrive. If more time is required, more pauses can be requested. This message can have a time-to-live of 2 minutes. |
| State-Pause-Acknowledge | During a pause, the transmitting node can send new data, changed data, and deleted data ids. The transmitting node can tag the last State-Changed-Contents message with a tag to inform the home node that the updates from the remote node are complete.<br>The home can use the State-Pause-Acknowledge message to acknowledge that it has received all the data. When the remote node sees the acknowledgement it can start a ten-minute timer. At the end of the ten minutes, if the home node is still up, the remote node can purge knowledge of deleted data for that data set because the home node is back in sync.<br>The State-Pause-Acknowledge can ensure that changes made to a data set's elements while the home is down are forwarded and confirmed even over DIL channels and across potentially problematic home node restarts.<br>This message can have a time-to-live of 2 minutes. |

Figure 4:
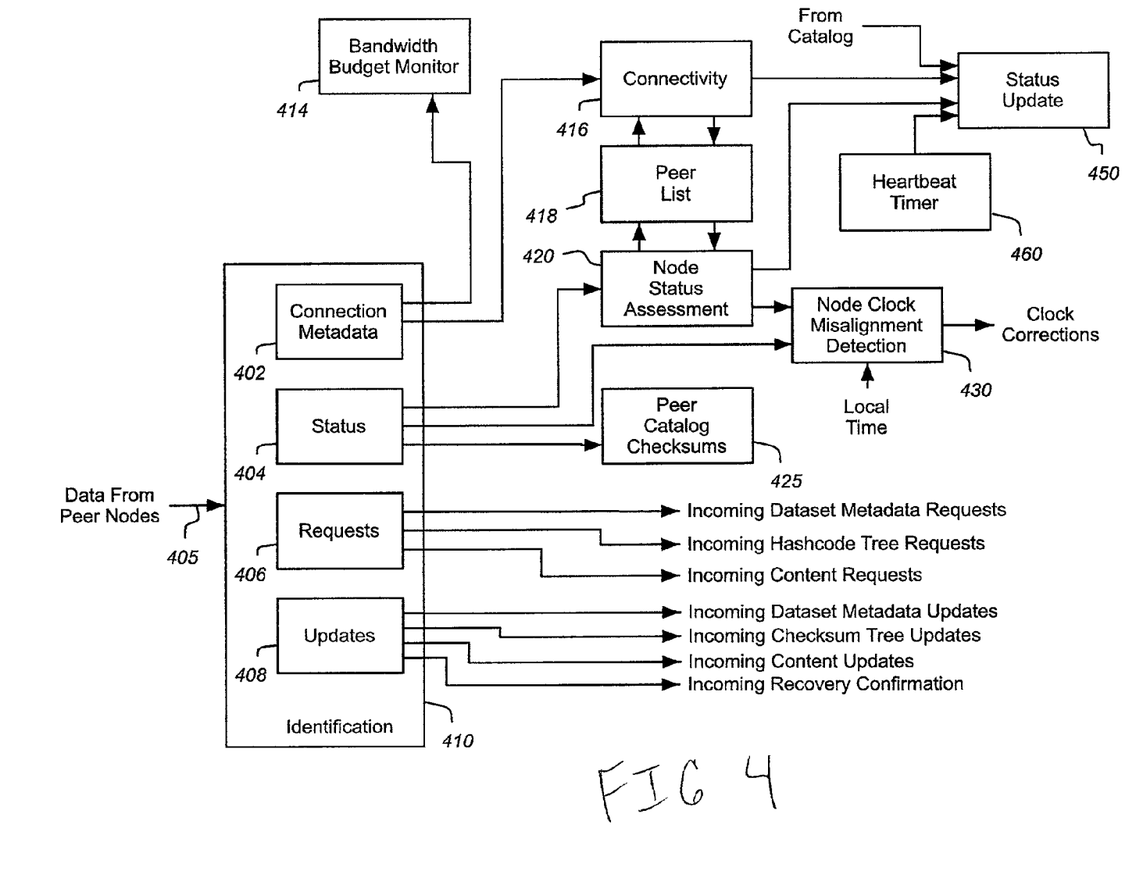
FIG. 4 shows system modules for a node to receive messages from peer nodes.
Figure 5:
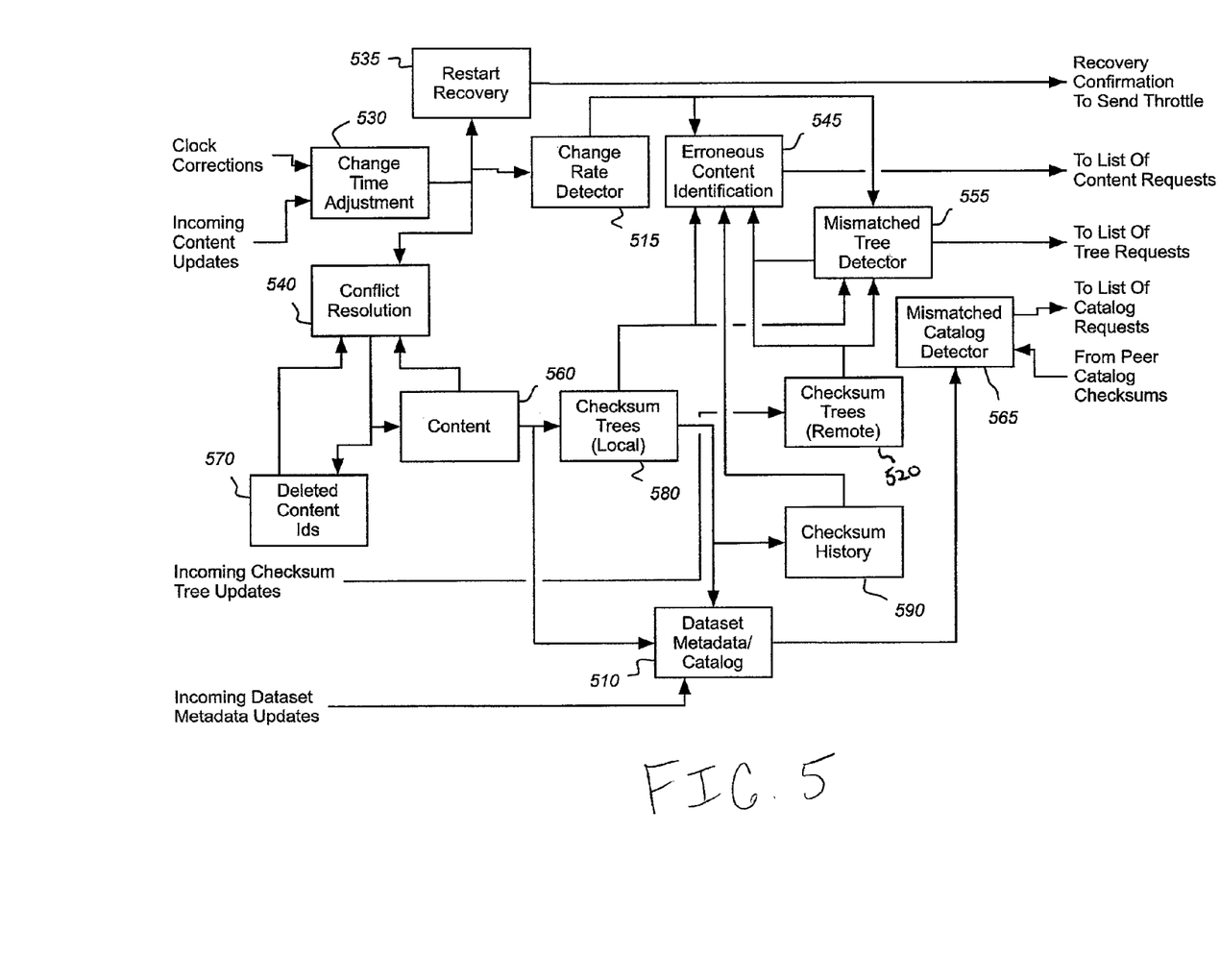
FIG. 5 shows system modules for a node to maintain a catalog and data sets.
Figure 6:
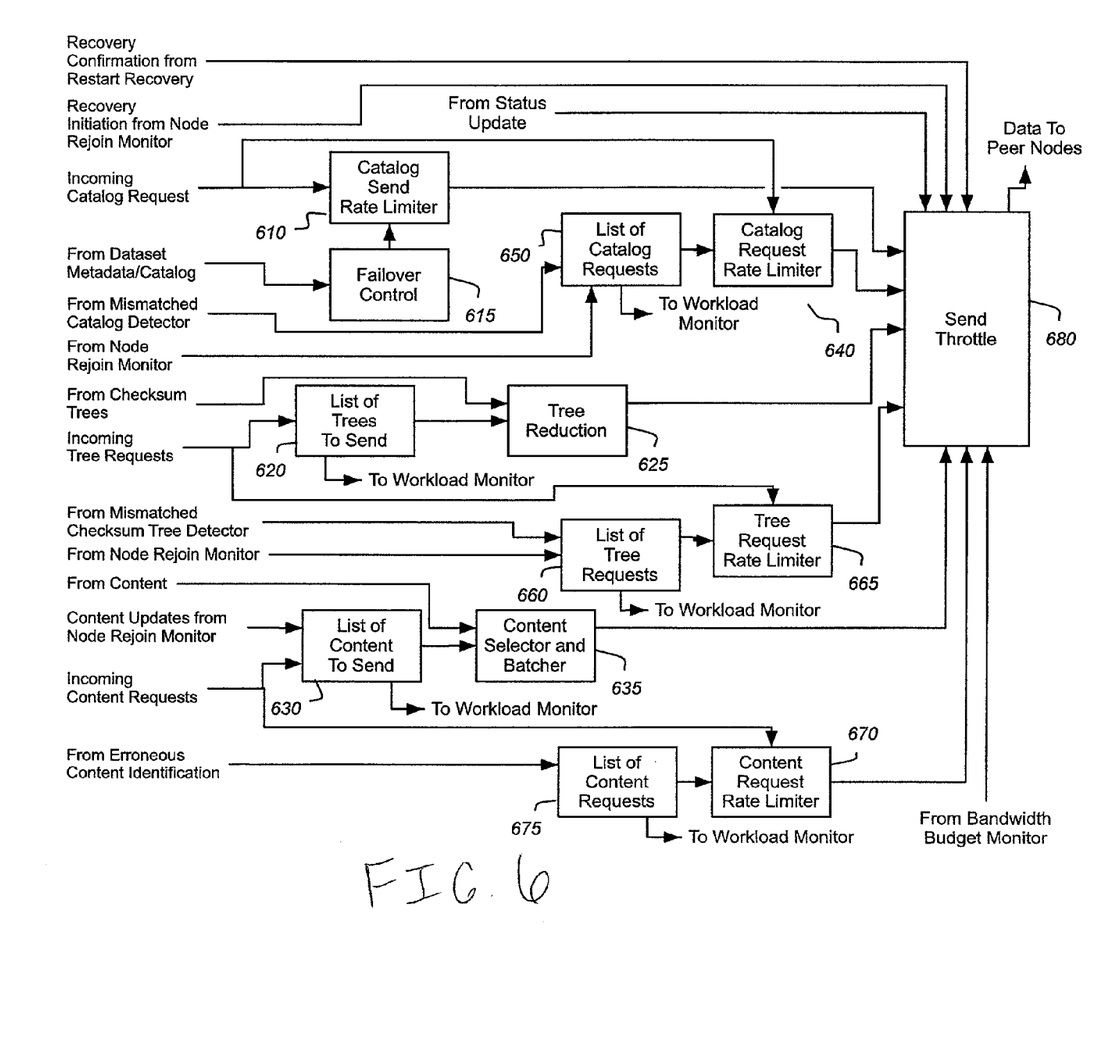
FIG. 6 shows system modules for a node to output data to peer nodes.
Figure 7:
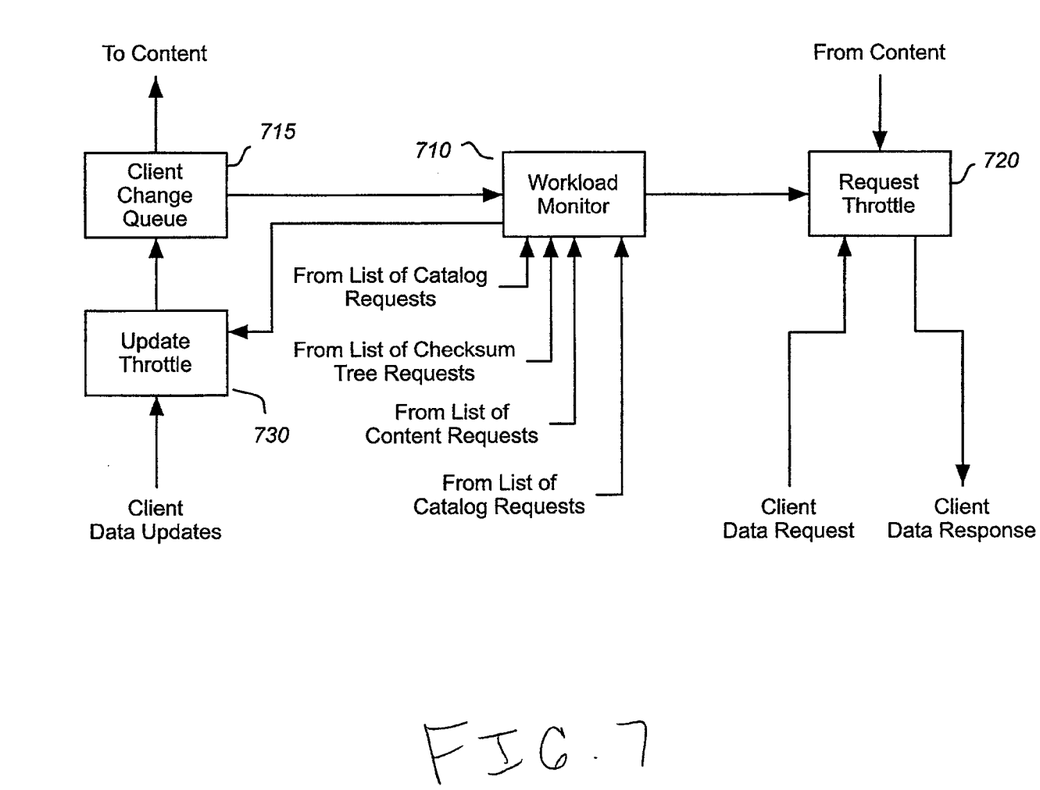
FIG. 7 shows system modules for a node to output data to clients.
Figure 8:
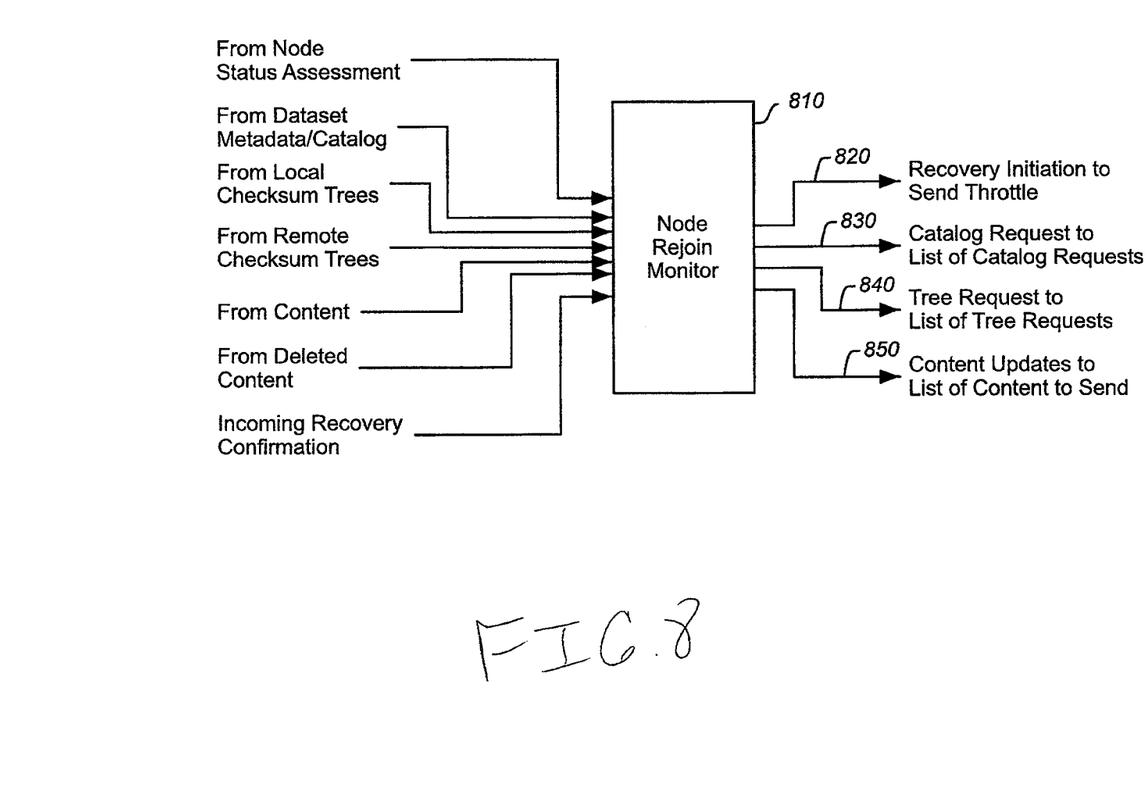
FIG. 8 shows system modules for a node to rejoin.

FIG. 4, FIG. 5, FIG. 6, FIG. 7 and FIG. 8 are diagrams of system modules for synchronizing data among a federation of servers. FIG. 4 shows system modules for a node to receive messages from peer nodes. FIG. 6 shows system modules for a node to output data to peer nodes. FIG. 5 shows system modules for a node to maintain a catalog and data sets. FIG. 7 shows system modules for a node to output data to clients. Various outputs of FIG. 4 are input to FIG. 5 and FIG. 6. Various outputs of FIG. 5 are input to FIG. 6 and FIG. 7. Thus, FIGS. 4-7 will be discussed together below. FIG. 8 shows system modules for a node to rejoin the federation after being disconnected.

Referring to FIG. 4, a first node in the federation of servers has an input 405 to receive data from peer nodes that are included in the federation of servers. Upon receipt of the data from peer nodes, an identification module 410 determines whether the data is connection metadata 402, status data 404 (e.g., heartbeat message), a request 406, or an update 408.

If the received data is connection metadata 402 (i.e., data that the transmitting peer node knows about other peer nodes) then, a) the bandwidth budget monitor module 414 determines a time duration that it takes a message to propagate from the first node to the peer node at one or more bandwidths, and b) connectivity module 416 determines the nodes that the transmitting peer node is in communication with, based on the peer nodes the first node in is in communication with. The connectivity module 416 communicates with a peer list module 418 to maintain 1) a list of peer nodes the first node communicates with, and 2) metadata about those nodes. The peer list module 418 communicates with a node status assessment module 420 to determine the current state of peer nodes on the peer node list.

The node status assessment module 420 determines a status for each of the peer nodes in the federation of servers based on a time duration since the first node received a heartbeat message from each peer node. The node assessment module 420 can assign a status of fully connected, partially connected or disconnected to each peer node in the federation of servers.

The node assessment module 420 can assign a status of fully connected to each peer node that is connected and has reliable data delivery. For example, the node assessment module 420 can assign the status of fully connected to each peer node for which the first node received two heartbeat messages from within the last three heartbeat periods.

The node assessment module 420 can assign a status of partially connect to each peer node that has partial but unreliable communication with the first node. The node assessment module 420 can assign a status of partially connected to each peer node that the node received one heartbeat message from within the last eight heartbeat periods.

The node assessment module can assign a status of disconnected to each peer node having no communication with the first node. The node assessment module 420 can assign a status of disconnected to each peer node which the node received. The node assessment module 420 can output a node status assessment to a remote restart recovery module 510 that will be further discussed below with respect to FIG. 5. In some embodiments, the node can take recovery actions if the node status changes from disconnected to fully connected. The recovery actions can include 1) obtaining a current catalog, if it has changed based on the catalog checksum, 2) obtaining a full checksum tree, 3) compare a full checksum tree to the locally generated checksum tree to determine if data elements are out of synchronization, and/or 4) receive, from the authoritative node, one or more new or changed elements that the authority obtained while the node was disconnected.

If the received data is status data 404, then a) the node status assessment module 420 can update its status determinations based on the received status data, b) a peer catalog checksum module 425 can update stored checksums of the peer nodes, and/or c) a node clock misalignment detector module 430 determines a clock correction (e.g., the difference between the local clock of the first node and the clock of the peer node) based on the time stamp in the status data when the time stamp in the status data differs from the local clock and input from the node status assessment module 420.

The node clock misalignment detector module 430 can determine the clock correction if the transmitting peer node is fully connected. If the transmitting peer node is partially connected or is disconnected then the last clock correction obtained when the transmitting peer node was connected is used. The node clock misalignment detector module 430 can output the updated local clock to a change time adjustment module 530 that will be further discussed below with respect to FIG. 5.

If the received data is requests 406 for data, then a) if the request is for data set metadata, then the request is forwarded to a catalog send rate limiter 610, as shown in FIG. 6, b) if the request is for hash code tree data, then the request is forwarded to list of trees to send module 620, as shown in FIG. 6 and c) if the request is for content, then the request is forwarded to the list of content to send module 630, as shown in FIG. 6.

If the received data is updates 408 of data sent by a peer node to update the node's contents, then a) if the update is to data set metadata, then the update is forwarded to the data set metadata catalog module 510, as shown in FIG. 5 b) if the update is to the hash code tree, then the update is forwarded to the checksum tree module 520, as shown in FIG. 5, and c) if the update is to the content, then the update is forwarded to the change time adjustment module 530, as shown in FIG. 5.

A status update module 450 generates heartbeat messages (e.g., heartbeat messages as described above) to transmit to peer nodes. The status update module 450 takes as input 452 a single checksum generated from the node's catalog (e.g., output of data set metadata/catalog 510), the list of the peer nodes the node is in communication with output from the connectivity module 416, the status of the peer nodes output from the nodes status assessment module 420, and a heartbeat timer module 460 that keeps track of when each heartbeat message is timed to be transmitted. The status update module 450 outputs a status update to a send throttle module 680 as shown in FIG. 6.

FIG. 5 shows system modules for a node to maintain a catalog and data sets. Upon receipt of incoming content updates, the change time adjustment module 530 corrects a time stamp of the content update data based on the clock corrections received from the node clock misalignment detection module 430, as described above in FIG. 4.

The change time adjustment module 530 outputs content updated with applied time-correction. The output of the change time adjust module 530 is input to a local restart recovery module 535. The local restart recovery module 535 can determine if the local node is a home node that has been disconnected. In some embodiments, the determination is made by detecting a flag in the content updates. In some embodiments, the flagged content update data is data that was missed by a newly connected local node. The local restart recovery module 535 can output a recovery confirmation that is input to the send throttle module 680 as shown in FIG. 6.

The output of the change time adjustment module 530 is input to a conflict resolution module 540. The conflict resolution module 540 determines the content data to store if there is a conflict between an incoming content update and the first node's content data. The conflict resolution module 540 can implement a last change wins policy meaning the content data with a time stamp that is latest in time is the content data the first node stores. The conflict resolution module 540 outputs identification of the content to be deleted to a deleted content identification module 570. The deleted content identification module 570 deletes the identified content from content module 560. The deleted content identification 570 also inputs the deleted content identification to the conflict resolution module 540 so that the content resolution module 540 can use the time of the deleted content to resolve conflicts.

A local checksum tree generator 580 generates a checksum tree for each data set in the content module 560. The checksum tree can be generated based on content from the content module 560. In some embodiments, the checksum tree is generated as follows:

First, a branching factor is determined. In some embodiments, the branching factor is computed by the node based on the number of items in the data set and the size of the data set. In some embodiments, the branching factor is a parameter selected at startup.

Second, a number of levels in the tree can be determined. The number of levels can be determined utilizing the branching factor such that the number of elements per bin is less than a predetermined bin size. In some embodiments, the predetermined bin size is input by an administrator.

Third, data elements are assigned to bins. Bins are assigned to tree leaves. Each data element can be assigned to a bin. A hash code for each element's unique id can be mapped into an index for the tree leaves. Some bins can have more or less than the bin size.

Fourth, a checksum is determined for each bin. The bin's checksum can be computed by exclusive or'ing the checksums for the content in each bin.

Fifth, checksums are filled in at all tree nodes up to the root. Starting from the bottom to the root of the tree, each sub-node's checksum can be computed as the exclusive-or of its descendant's. Each child can be mapped to its parent node based on its index at that level modulus the number of node's at the parent's level.

A remote checksum tree generator 520 generates a checksum tree for each checksum tree update received from the identification module 410, as described above in FIG. 4. The remote checksum tree can be generated in the same way the local checksum tree is generated.

The checksum tree generator 580 outputs the checksum trees to a checksum tree history module 590 and the data set metadata/catalog module 510. The checksum tree history module 590 can keep a record of changes to the root checksum of each checksum tree. The data set metadata/catalog module 510 stores metadata for each data set including the current root checksum of each data set's checksum tree.

The output of the change time adjustment module 530 can also be input to a change rate detector module 515. The change rate detector module 515 can detect if incoming changes are occurring quickly to limit the rate at which the mismatched tree detector 555 and the erroneous content identification module 545 perform their respective functions. The erroneous content identification module 545 determines whether there is a need to have the data retransmitted based on the output of the local checksum tree generator module 580 and the remote checksum tree generator module 520. The erroneous content identification module 545 outputs content identification data to a list of content to send module 630, as discussed below with respect to FIG. 6.

The mismatch tree detector 555 determines whether the checksum tree generated by the local checksum tree generator 580 is consistent with the checksum tree generated by the remote checksum tree generator module 520. In the event of an inconsistency, the mismatch checksum tree detector 555 identifies the data set identification of the mismatched checksum tree and determines whether the two trees have the same number of levels. If the two trees have the same number of levels then the mismatched tree detector outputs a request for a portion of the tree. If the two trees have a different number of levels then the mismatched tree detector outputs a request for the entire tree. The mismatch tree detector 555 outputs the identification of the data set with the mismatched checksum tree to a list of tree requests module 660, as discussed below with respect to FIG. 6.

The mismatch catalog detector 565 determines whether the received catalog and the local catalog are the same based the checksum history and the data set catalog. The mismatched catalog detector module 565 outputs catalog data to a list of catalog requests module 650, as discussed below with respect to FIG. 6.

FIG. 6 shows the system modules for a node to output data to peer nodes. Upon receipt of a catalog request input from a peer node or a catalog request generated by the failover control module 615, the catalog send rate limiter module 610 determines if the catalog request was intended for this node. The catalog send rate limiter module 610 can limit the number of catalog requests over a time window (e.g., one, two or any number of minutes). The number can be a function of available bandwidth. The catalog request can be output to the send throttle module 680. The failover control module 615 generates a catalog request when a peer node is a node that this node backs up.

The catalog request from a peer node is also input to a catalog request rate limiter module 640. The catalog request rate limiter module 640 can ensure that requests generated by this node are not the same as requests recently generated by peer nodes. The catalog request rate limiter module 640 filters out duplicate requests based on the list of catalog requests in the list of catalog requests module 650. The catalog request rate limiter module 640 outputs catalog requests to the send throttle module 680.

Upon receipt of a tree request from a peer node, a tree reduction module 625 reduces the size of the requested tree based on whether a full or partial tree was identified in the list of trees to send in the list of trees to send module 620. The full or partial trees are obtained from the local checksum tree generator module 580 as described above in FIG. 5. The incoming tree request is also input to a tree request rate limiter module 665 that limits the rate at which tree requests are output to the send throttle module 680 based on a list of tree requests in a list of tree requests module 660.

The send throttle module 680 prevents overload of the available bandwidth to transmit messages to peer nodes. The send throttle module 680 can be a queue with timed transmission such that requests are transmitted on a first-come first-serve basis. The send throttle module 680 can transmit requests at times that are a function of the bandwidth of the connection between the node and peer nodes.

Upon receipt of an incoming content request from a peer node, a content selector and batcher module 635 determines which content to transmit to the peer node and groups multiple content from the same data set into a single message based on the list of content to send in the list of content to send module 630. The incoming content request is also input to a content request rate limiter module 670 that limits the rate at which content requests are output to the send throttle module 680 based on a list of content requests in a list of content request module 675.

FIG. 7 shows the system modules for a node to output data to a client. The client can use the node to get catalog data for data sets visible to the node, make subscriptions to data sets visible to the node, and view, change and delete content. A workload monitor 710 has as input a list of catalog requests, a list of checksum tree requests, a list of content requests, and a list of changes made to content by the client. The list of catalog requests can be output from the list of catalog requests module 650, as described above in FIG. 6. The list of checksum tree requests can be output from the list of checksum tree requests module 660, as described above in FIG. 6. The list of content requests can be output from the list of content requests module 675, as described above in FIG. 6. The list of changes made to content by the client can be output from the client change queue module 715. The workload monitor module 710 limits the number of interactions with the client. The workload monitor module 710 can determine if there is an excessive backlog of tasks to be completed. For example, if the workload monitor determines there are more than 100 tasks, then the determination that an excessive number of tasks exists is made. The workload monitor module 710 can output its determination to a request throttle module 720. The request throttle module 720 takes as input client data requests. The request throttle module 720 outputs the client data response at a rate which can be limited if the workload monitor has determined that there is an excessive backlog of tasks. The workload monitor module 710 can output its determination of an excessive backlog to an update throttle module 730. The update throttle module 730 can delay the rate at which input client data updates are accepted if the workload monitor module 710 has determined that there is an excessive backlog of tasks.

FIG. 8 shows system modules for a node to rejoin. A node rejoin monitor module 810 detects that a previously disconnected peer node has transitioned from disconnected to fully connected and transmits a sequence of outputs to the peer node. The node rejoin monitor module 810 has inputs of: 1) node status assessment from the node status assessment module 420, 2) data set metadata/catalog from data set metadata/catalog 510, 3) local checksum tree from local checksum tree module 580, 4) remote checksum tree from remote checksum tree module 520, 4) content from content module 560, 5) deleted content from deleted content ids module 570, and 6) incoming recovery confirmation from update data module 408. Upon detection that a previously disconnected peer node has become connected based on input from the node status update module 420, the node rejoin monitor module 810 identifies if there are content updates that the peer node has missed by comparing the local checksum tree and the remote checksum tree and by examining the timestamps of the deleted content. If the node rejoin monitor module 810 determines that there are content updates that the peer node has missed it outputs a recovery initiation 820 to the send throttle module 680. The node rejoin monitor module 810 transmits a catalog request 830 to the catalog requests module 650 if the checksum of the catalog in the latest node status update is different than the checksum in the data set metadata/catalog. The node rejoin monitor module 810 outputs a checksum tree request 840 to the tree requests module 660 if the root checksum of the local copy of the checksum tree differs from the root checksum of the remote checksum tree. If the catalog/metadata matches and checksum tree checksums match, or when the catalog/metadata and checksum tree checksums match in response to messages received by the processes illustrated in FIG. 4 and described above, then the node rejoin monitor can output content updates to a list of content updates module 850. The content updates that are necessary are determined by comparing the local checksum tree and the remote checksum tree for data sets that are homed at the peer node that was previously disconnected and has transitioned to fully connected status.

In some embodiments, the nodes of the distributed system 100 communicate via Transmission Control Protocol (TCP) or other Internet Protocols (IP). In some embodiments, communication is encrypted. In some embodiments, the standard secure sockets layer (SSL) protocol stacks are used. In some embodiments, the nodes are authenticated using Public Key Infrastructure (PKI) and administrator configurable authentication tokens. In some embodiments, communication between nodes is based on an embedded Java messaging system. In these embodiments, topics and durable subscriptions can be used with time limited messaging life. In some embodiments, messages used to facilitate communication between nodes have a fixed time-to-live that is less than five minutes. This prevents growth of messages transmitted to nodes that are unreachable for days.

The above described techniques can be implemented in a variety of ways. The components of the system can be interconnected by any form or medium of digital data communication (e.g., a communication network). The system can include clients and servers. A client and a server are generally remote from each other and typically interact through a communication network. The relationship of client and server arises by virtue of computer programs running on the respective computers and having a client-server relationship to each other.

One skilled in the art can appreciate the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computerized-method of synchronizing data among a federation of servers interconnected over a network having at least one of intermittent or low signal transmission bandwidth, comprising:

receiving, by a first server that is part of the federation of servers, an update message from one or more servers that is part of the federation of servers, wherein the federation of servers comprises at least three servers;

determining, by the first server, a connection status for one or more servers in the federation of servers, wherein the connection status comprises the first server being fully connected, partially connected or disconnected from each server of the one or more servers;

maintaining, by the first server, (i) a catalog of data sets that reside on the first server based on the status and the update message received from one or more of the servers in the federation of servers, and (ii) a checksum tree for each data set comprising one or more levels of tree nodes;

determining, by the first server, a checksum value based on a checksum tree for each data set the first server is an authority;

transmitting, by the first server, the checksum value and a maximum rate at which the first server can receive message to each server in the federation of servers;

determining, by the first server, if each data set that resides on the first server is erroneous based on the connection status, the catalog, and the checksum tree of the corresponding data set;

identifying, by the first server, for each erroneous data set, at least a mismatched portion of the corresponding checksum tree that correlates to a section of the erroneous data set requiring synchronization, the mismatched portion of the checksum tree being determined based on the one or more levels of the checksum tree;

transmitting, by the first server, one or more update requests to each server of the federation of servers that is an authoritative server of one or more of the erroneous data sets; and synchronizing, by the first server, the erroneous data sets that reside on the first server by receiving one or more responses to the one or more update requests, wherein synchronization occurs at the section of each erroneous data set identified by the mismatched portion of the checksum tree.

2. The computerized-method of claim 1 wherein determining a connection status for each server in the federation of servers further comprises:
determining if the first server is fully connected, partially connected, or disconnected to each server that is part of the federation of servers based on a number of messages received by the first server from each of the servers within a time duration; and
determining if a value of a local clock of the first server is substantially similar to a value of a clock of one or more servers that is part of the federation of servers based on whether the first server is fully connected, partially connected or disconnected.

3. The computerized-method of claim 2 wherein maintaining a catalog for each data set that resides on the first server further comprises:
determining an identity of an authoritative server for the data set in each of the one or more received update messages and the one or more received responses;
determining an identity of a backup server for the data set in each of the one or more received update messages and the one or more received responses;
determining a size and type for the data set in each of the one or more received update messages and the one or more received responses; and
storing, for each data set of the one or more received update messages and the one or more received responses, the authoritative server, the backup server, the size of the data and the type of the data.

4. The computerized-method of claim 1 further comprising:
comparing, by the first server, each data set received by the first server with a corresponding data set that is stored on the first server; and
overwriting, by the first server, the corresponding data set that is stored on the first server with received data if the received data was transmitted by a server that owns the data set or if time stamps of the received data are later in time than time stamps of the corresponding data set.

5. The computerized-method of claim 3 further comprising:
comparing, by the first server, for each data set stored on the first server, the determined checksum tree with a reference checksum tree received from the authoritative server for each data set stored on the first server.

6. The computerized-method of claim 1 further comprising:
determining, by the first server, a checksum tree value for each data set the first server transmits based on the checksum tree of each data set; and
determining, by the first server, a portion of the checksum tree to transmit based on the checksum tree value.

7. The computerized-method of claim 2 further comprising:
determining, by the first server, a maximum rate at which messages can be transmitted to each of the servers in the federation of servers; and
limiting, by the first server, a rate at which messages are transmitted to each server of the federation of servers that is connected within the time duration.

8. The computerized-method of claim 1 further comprising:
determining, by the first server, a number of incomplete client requests stored on the first server; and
delaying, by the first server, subsequent received client requests for a time duration if the number of incomplete client requests exceeds a maximum number of incomplete client requests, wherein the time duration is based on the number of incomplete client requests stored on the first server.

9. The computerized-method of claim 1 further comprising:
designating, by the first server, one server of the federation of servers as a backup server for each data set stored on the first server, wherein the backup server receives the data sets that reside on the first server, and is prepared to act as a backup if the first server becomes disconnected.

10. The computerized-method of claim 9 further comprising:
receiving, by the backup server, the update message from one or more servers that is part of the federation of servers;
determining, by the backup server, a connection status for one or more servers in the federation of servers;
maintaining, by the backup server, a catalog for each data set that resides on the backup server based on the status and the update message received from one or more of the servers in the federation of servers;
determining, by the backup server, if each data set that resides on the backup server is erroneous based on the connection status and the catalog;
transmitting, by the backup server, one or more update requests to each server of the federation of servers that is an authoritative server of one or more of the erroneous data sets; and
synchronizing, by the backup server, the erroneous data sets that reside on the first server by receiving one or more responses to the one or more update requests.

11. The computerized-method of claim 10 further comprising;
determining, by the backup server, if the first server is disconnected; and
synchronizing, by the backup server, the first server with the backup server when the first server reconnects by transmitting at least a portion of one of the data sets and the catalogs to the first server.

12. The computerized-method of claim 1 further comprising:
determining, by the first server, if a received request is redundant by comparing the received request to any request received having a time duration prior to the time at which the received request was received.

13. The computerized-method of claim 1 further comprising:
determining, by the first server, each server in the federation of servers that is subscribed to the first server, wherein each server is directly connected to the first server or connected to a server in the federation of servers that is directly connected to the first server; and
transmitting, by the first server, data to each server in the federation of servers that is subscribed to the first server.

14. A computer program product tangibly embodied in a non-transitory machine-readable storage device for synchronizing data among a federation of servers interconnected with intermittent and low bandwidth, the computer program product being operable to cause a first server that is part of a federation of servers to:

receive an update message from one or more servers that is part of the federation of servers, wherein the federal of servers comprises at least three servers;

determine a connection status for one or more servers in the federation of servers: wherein the connection status comprises the first server being fully connected, partially connected or disconnected from each server of the one or more servers;

maintain (i) a catalog for each data set that resides on the first server based on the status and the update message received from one or more of the servers in the federation of servers, and (ii) a checksum tree for each data set comprising one or more levels of tree nodes:

determine, by the first server, a checksum value based on a checksum tree for each data set the first server is an authority;

transmit, by the first server, the checksum value and a maximum rate at which the first server can receive message to each server in the federation of servers;

determine if each data set that resides on the first server is erroneous based on the connection status, the catalog, and the checksum tree of the corresponding data set;

identify, for each erroneous data set, at least a mismatched portion of the corresponding checksum tree that correlates to a section of the erroneous data set requiring synchronization, the mismatched portion of the checksum tree being determined based on the one or more levels of the checksum tree;

transmit one or more update requests to each server of the federation of servers that is an authoritative server of one or more of the erroneous data sets; and synchronize the erroneous data sets that reside on the first server by receiving one or more responses to the one or more update requests, wherein synchronization occurs at the section of each erroneous data set identified by the mismatched portion of the checksum tree.

15. The computer program product of claim 14 wherein determining a connection status for each server in the federation of servers further comprises:

determining if the first server is fully connected, partially connected, or disconnected to each server that is part of the federation of servers based on a number of messages received by the first server from each of the servers within a time duration; and determining if a value of a local clock of the first server is substantially similar to a value of a clock of one or more servers that is part of the federation of servers based on whether the first server is fully connected, partially connected or disconnected.

16. The computer program product of claim 14 wherein maintaining a catalog for each data set that resides on the first server further comprises:

determining an identity of an authoritative server for the data set in each of the one or more received update messages and the one or more received responses;

determining an identity of a backup server for the data set in each of the one or more received update messages and the one or more received responses;

determining a size and type for the data set in each of the one or more received update messages and the one or more received responses; and storing, for each data set of the one or more received update messages and the one or more received responses, the authoritative server, the backup server, the size of the data and the type of the data.

* * * * *